US008818960B2

(12) United States Patent
Dhamankar et al.

(10) Patent No.: US 8,818,960 B2
(45) Date of Patent: Aug. 26, 2014

(54) TRACKING REDO COMPLETION AT A PAGE LEVEL

(75) Inventors: Robin Dhananjay Dhamankar, Bellevue, WA (US); Hanumantha Rao Kodavalla, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 354 days.

(21) Appl. No.: 13/051,970

(22) Filed: Mar. 18, 2011

(65) Prior Publication Data
US 2012/0239628 A1  Sep. 20, 2012

(51) Int. Cl.
*G06F 7/00* (2006.01)
(52) U.S. Cl.
USPC ........... 707/683; 707/610; 707/615; 711/170
(58) Field of Classification Search
USPC ................................... 707/609–686
See application file for complete search history.

(56) References Cited

U.S. PATENT DOCUMENTS

| 5,333,303 | A  | * | 7/1994  | Mohan .............. 714/20 |
|-----------|----|---|---------|---------------------------|
| 6,000,020 | A  |   | 12/1999 | Chin et al.               |
| 6,185,699 | B1 |   | 2/2001  | Haderle et al.            |
| 6,289,357 | B1 |   | 9/2001  | Parker                    |
| 6,721,739 | B1 |   | 4/2004  | Mende et al.              |
| 6,751,636 | B1 |   | 6/2004  | Mende et al.              |
| 6,859,811 | B1 |   | 2/2005  | Chandrasekaran et al.     |
| 7,051,052 | B1 |   | 5/2006  | Shapiro et al.            |
| 2002/0042788 | A1 | | 4/2002  | Goralwalla et al.         |
| 2005/0203974 | A1 | | 9/2005  | Smith et al.              |
| 2005/0235017 | A1 | | 10/2005 | Ashman                    |
| 2005/0235119 | A1 | * | 10/2005 | Sechrest et al. ......... 711/158 |
| 2006/0235909 | A1 | * | 10/2006 | Oks et al. ............... 707/204 |
| 2008/0034251 | A1 | | 2/2008  | Singhal et al.            |

FOREIGN PATENT DOCUMENTS

WO  WO2004021667  3/2004

OTHER PUBLICATIONS

Edwin Sarmiento, Dec. 12, 2008, Using Page Level Restore as a Disaster Recovery Procedure in SQL Server 2005, Dec. 30, 2010 (Retrieved Date), (3 pages).
C. Mohan, A Cost-Effective Method for Providing Improved Data Availability During DBMS Restart Recovery After a Failure, Dec. 30, 2010 (Retrieved Date), (pp. 368-379).
Derby Logging and Recovery, Dec. 30, 2010 (Retrieved Date), (7 pages).

* cited by examiner

*Primary Examiner* — Tony Mahmoudi
*Assistant Examiner* — Tuan-Khanh Phan
(74) *Attorney, Agent, or Firm* — Nicholas Chen; David Andrews; Micky Minhas

(57) ABSTRACT

Embodiments are directed to implementing a transitional redo phase to allow pre-redo phase data access and to determining which data pages including unprocessed transactions are to be processed during a transitional redo phase. In an embodiment, a computer system initiates an analysis phase of a database recovery that scans a database transaction log and builds a dirty page table that includes pages corresponding to unprocessed data transactions. The computer system determines from the dirty page table which pages are to be processed during the transitional redo phase, before the final redo phase. The computer system processes the determined pages during the transitional redo phase, before the final redo phase is reached and, upon completion of the system transaction undo phase, makes available those pages that were processed during the transitional redo phase, as well as those database pages that are not scheduled for processing during the final redo phase.

17 Claims, 4 Drawing Sheets

TRACKING REDO COMPLETION AT A PAGE LEVEL

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In many cases, software applications are designed to interact with other software applications or other computer systems. For example, internet users may interact with web servers via a web browser. The user may request a specified service such as email and receive data corresponding thereto. In some cases, the web server may retrieve data from a database to fulfill the user's request. These databases may store the data for many millions of users. As such, the databases are frequently backed up to ensure the users' data is safe. However, at times, database servers may fail, and the failures may occur while client or server transactions are under way. Multiple steps are then performed to bring the database back online. While these steps are being performed, users do not have access to the data from that database.

BRIEF SUMMARY

Embodiments described herein are directed to implementing a transitional redo phase to allow pre-redo phase data access and to determining which data pages containing unprocessed transactions are to be processed during a transitional redo phase. In one embodiment, a computer system initiates an analysis phase of a database recovery that scans a database transaction log and builds a dirty page table that includes pages corresponding to unprocessed data transactions. The computer system determines from the dirty page table which pages are to be processed during the transitional redo phase, before the final redo phase. The computer system processes the determined pages during the transitional redo phase, before the final redo phase is reached and, upon completion of the system transaction undo phase, makes available those pages that were processed during the transitional redo phase, as well as those database pages that are not scheduled for processing during the final redo phase.

In another embodiment, a computer system initiates an analysis phase of a database recovery that scans a database transaction log and builds a dirty page table that includes pages corresponding to unprocessed data transactions. The computer system accesses the database transaction log to determine which priority data pages have been accessed a threshold number of times over a specified time period. The computer system also accesses the dirty page table to determine which data pages including unprocessed transactions are to be processed during the transitional redo phase. The computer system then processes both the priority data pages and the determined data pages including unprocessed transactions during the transitional redo phase, before the final redo phase is reached.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
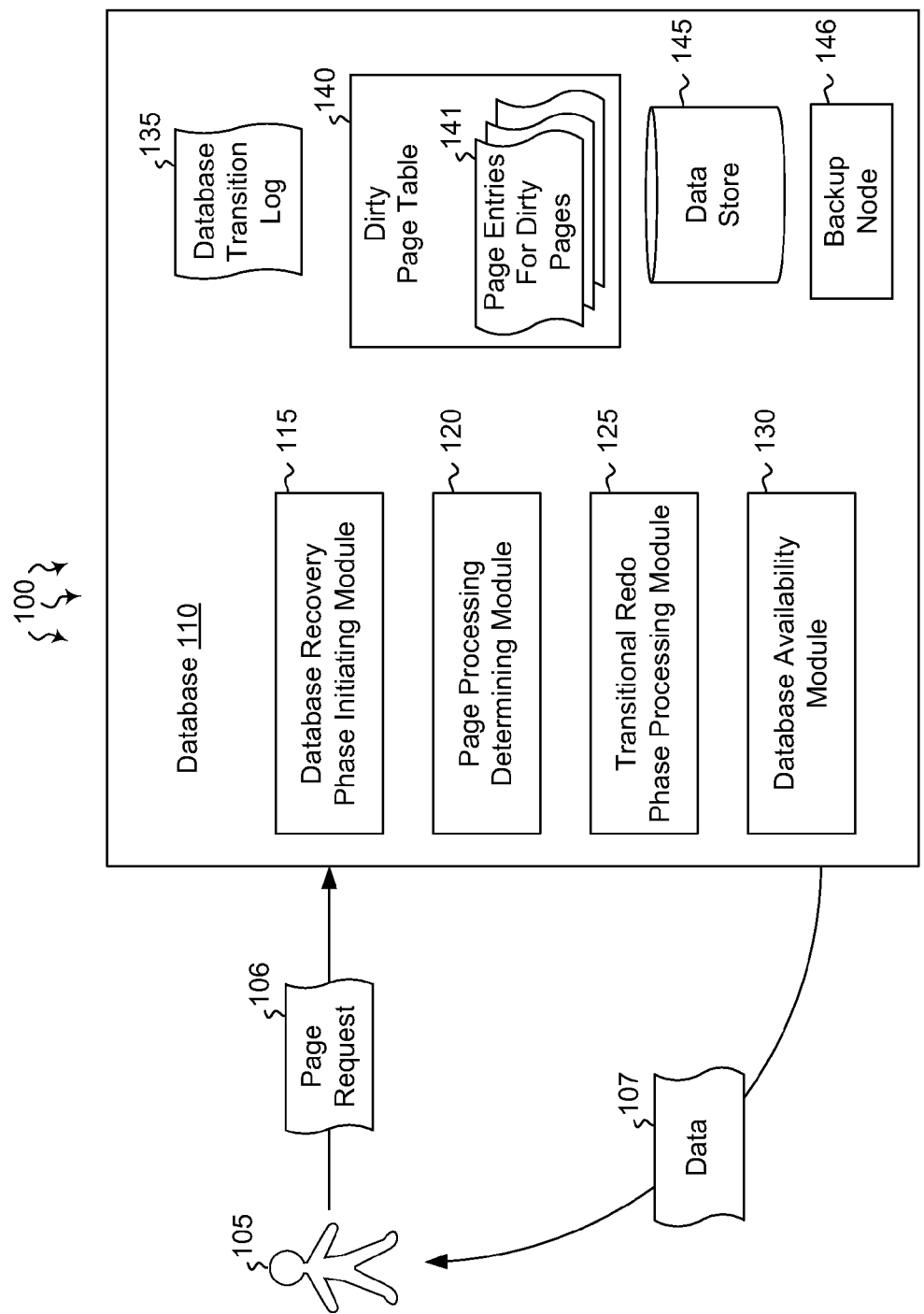
FIG. 1 illustrates a computer architecture in which embodiments of the present invention may operate including implementing a transitional redo phase to allow pre-redo phase data access and to determining which data pages including unprocessed transactions are to be processed during a transitional redo phase.

Embodiments described herein are directed to implementing a transitional redo phase to allow pre-redo phase data access and to determining which data pages containing unprocessed transactions are to be processed during a transitional redo phase. In one embodiment, a computer system initiates an analysis phase of a database recovery that scans a database transaction log and builds a dirty page table that includes pages corresponding to unprocessed data transactions. The computer system determines from the dirty page table which pages are to be processed during the transitional redo phase, before the final redo phase. The computer system processes the determined pages during the transitional redo phase, before the final redo phase is reached and, upon completion of the system transaction undo phase, makes available those pages that were processed during the transitional redo phase, as well as those database pages that are not scheduled for processing during the final redo phase.

In another embodiment, a computer system initiates an analysis phase of a database recovery that scans a database transaction log and builds a dirty page table that includes pages corresponding to unprocessed data transactions. The computer system accesses the database transaction log to determine which priority data pages have been accessed a threshold number of times over a specified time period. Information about which pages are frequently accessed may be determined during runtime and recorded in the transaction log. After a crash, a data recovery process may use the information in the log to determine what pages are frequently accessed. The computer system also accesses the dirty page table to determine which data pages including unprocessed transactions are to be processed during the transitional redo phase. The computer system then processes both the priority data pages and the determined data pages including unprocessed transactions during the transitional redo phase, before the final redo phase is reached. Including the priority (frequently accessed) pages may be beneficial as user workloads may block behind the redo of these pages.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry data or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks (e.g. cloud computing, cloud services and the like). In a distributed system environment, program modules may be located in both local and remote memory storage devices.

FIG. 1 illustrates a computer architecture 100 in which the principles of the present invention may be employed. Computer architecture 100 includes database 110. Database 110 may be any type of local or distributed database, including cloud databases. The database may have one or more data stores 145 which may be located on a local computer system or may be distributed over multiple computer systems. The database may be configured to receive data requests 106 from various computer users 105. The database processes the data request and responds to the user with data 107. In some cases, the database may need to recover from a failure. The failure could be hardware- or software-related. In order to ensure that the user is provided accurate, up-to-date data, the database initiates a recovery phase to properly and fully recover from the failure. Module 115 of the database may be configured to initiate this recovery phase. The recovery may be a full recovery, or may be a partial recovery from a failover or backup node 146.

Figure 4:
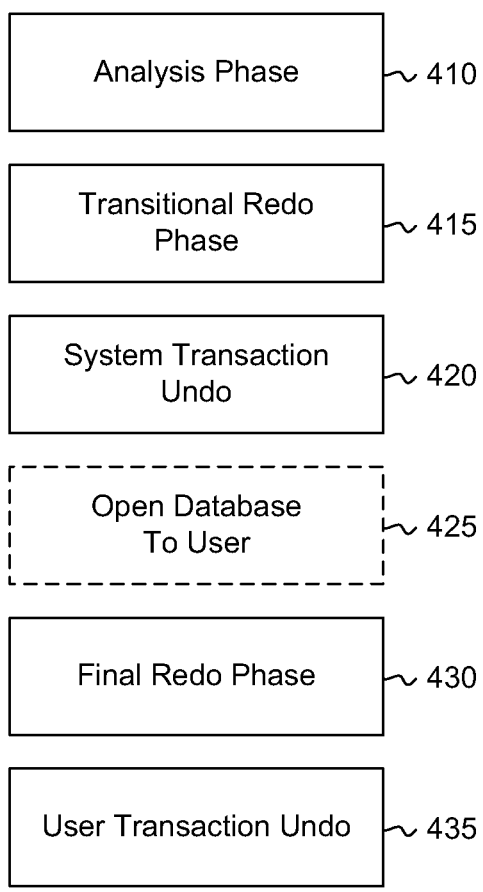
FIG. 4 illustrates a flowchart of an example database recovery phase

The recovery phase may include and/or initiate other phases. For example, as shown in the database recovery phases 400 of FIG. 4, analysis phase 410 may be initiated as an initial step in recovering the database. During the analysis phase, the page processing determining module 120 of the database may be configured to look at the dirty page table 140 to determine which data pages 141 have not been processed. At least some of these unprocessed pages are then scheduled for processing during the recovery's transitional redo phase 415. The page processing determining module determines which unprocessed pages are most important and are to be processed first. The page processing module may use various criteria to determine which pages are the most important, as will be explained in greater detail below.

The transitional redo phase processing module 125 may then process those pages determined to be most important during analysis phase 410. The transitional redo phase is implemented before a final redo phase. The database recovery phases then include a system transaction undo phase 420, which completes the transactions processed in the transitional redo phase. Once the system transaction undo phase is complete, the majority of the database can be opened up to the user (phase 425, module 130). Only those pages still in the dirty page table are not accessible once the database has been opened up to database users. The unprocessed pages are then processed and the final redo phase 430 is initiated, followed by the user transaction undo 435. After the completion of 430 and 435, all database pages are available for use by database users. These concepts will be explained below in greater detail with regard to methods 200 and 300 of FIGS. 2 and 3.

Figure 2:
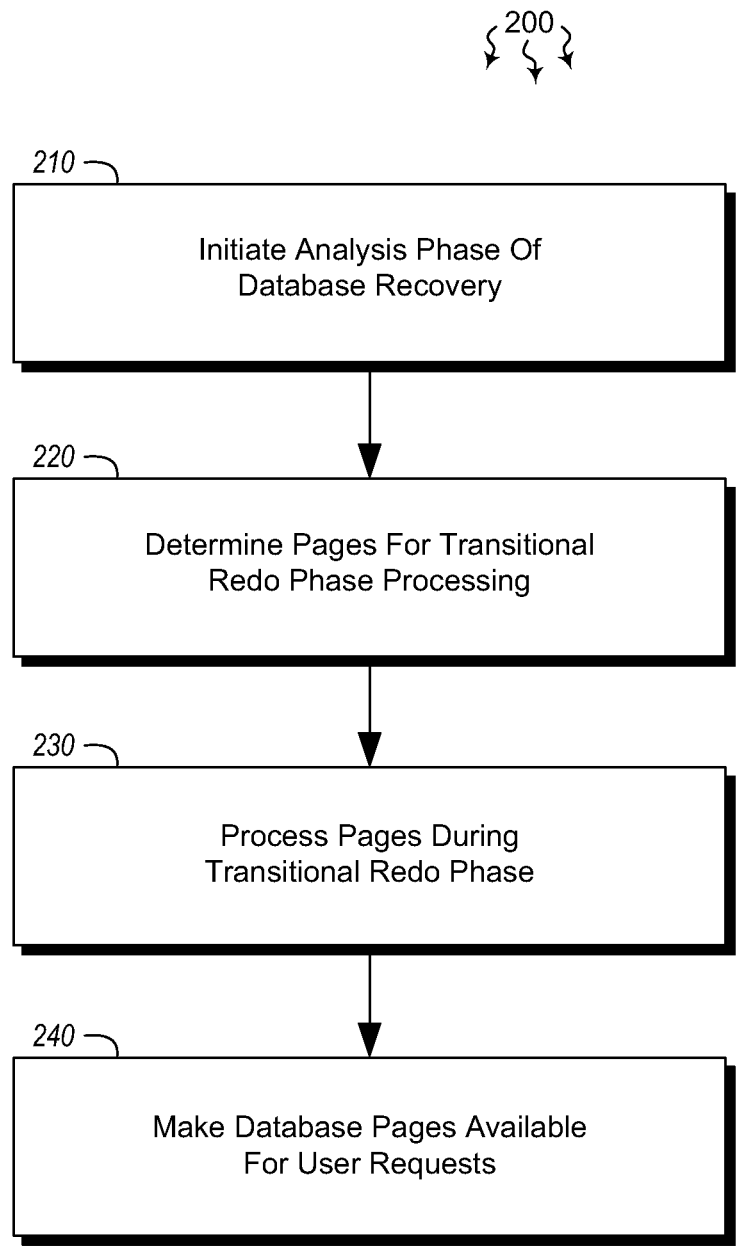
FIG. 2 illustrates a flowchart of an example method for implementing a transitional redo phase to allow pre-redo phase data access.
Figure 3:
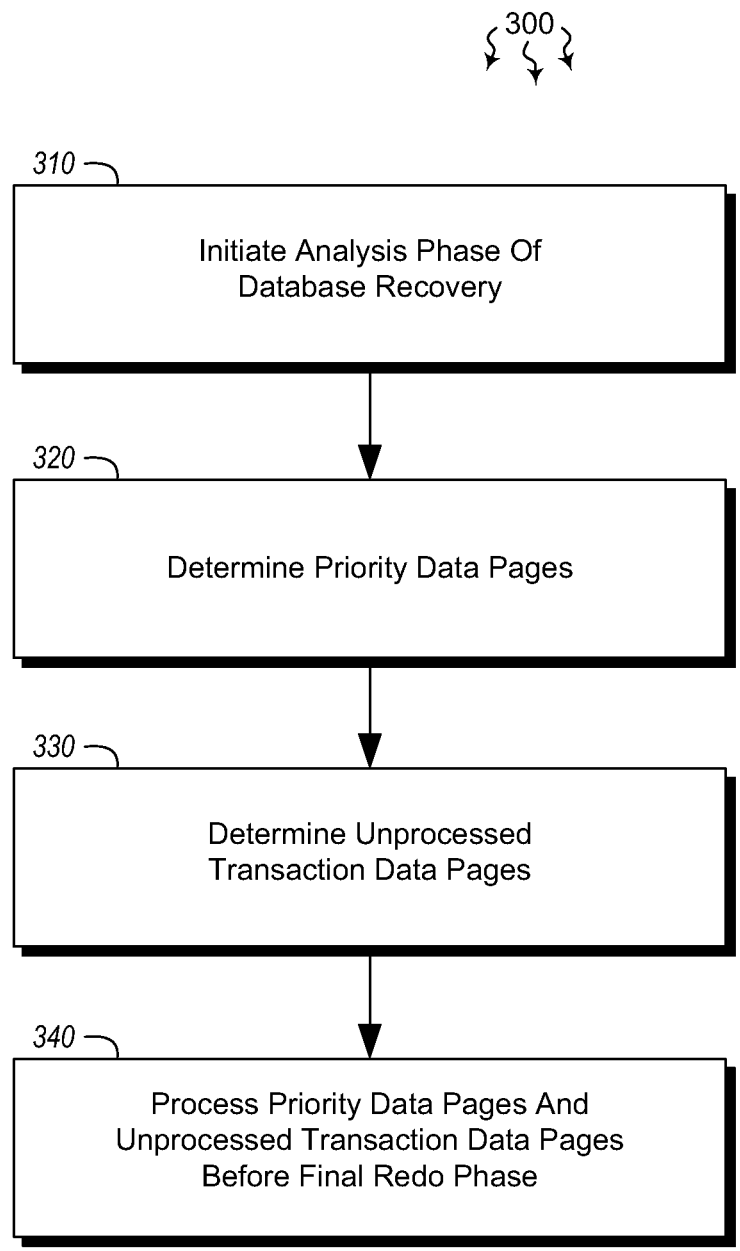
FIG. 3 illustrates a flowchart of an example method for determining which data pages including unprocessed transactions are to be processed during a transitional redo phase.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for implementing a transitional redo phase to allow pre-redo phase data access. The method 200 will now be described with frequent reference to the components and data of environment 100, as well as the elements of FIG. 4.

Method 200 includes an act of initiating an analysis phase of a database recovery, wherein the analysis phase scans a database transaction log and builds a dirty page table that includes one or more pages corresponding to unprocessed data transactions (act 210). For example, database recovery phase initiating module 115 may initiate analysis phase 410. The analysis phase may scan database transaction log 135 and build a dirty page table 140 that includes various pages or entries 141 that correspond to unprocessed data transactions. These pages may include pages that were being processed when the database crashed. These pages are then accounted for in the dirty page table, and processed in other recovery phase processes.

Method 200 includes an act of determining from the dirty page table which pages are to be processed during the transitional redo phase, before the final redo phase (act 220). For example, page processing determining module 120 may determine from the entries in the dirty page table 140 which pages are to be processed during transitional redo phase 415. The transitional redo phase may be an intermediate redo phase that occurs prior to the traditional, final redo phase 430. The transitional redo phase may be shorter than the final redo phase and may be thought of as a mini-redo phase. This shorter, transitional phase may be implemented, along with system transaction undo, to open the database to the user 425 before the full, final redo phase and user transaction undo are complete. As such, user requests may be received and processed at the database before the final redo phase is complete.

In some cases, a flag may be added to each of the pages that represent an unprocessed data transaction. The flag may indicate that the flagged page is to be processed during the transitional redo phase. In some embodiments, events may be instantiated to wait for the flagged pages that are flagged for processing during the transitional redo phase. A linked list of pages may be created that includes those flagged pages that are to be processed during the transitional redo phase.

Method 200 includes an act of processing the determined pages during the transitional redo phase, before the final redo phase is reached (act 230). For example, transitional redo phase processing module 125 may process the determined (flagged) pages during transitional redo phase 415. Accordingly, pages that are to be processed in system transaction undo, as well as priority (frequently accessed) pages, are flagged for processing during transitional redo. These flagged pages are processed in order to allow the rest of the database to be opened upon completion of system transaction undo.

In some cases, the pages flagged for processing during the transitional redo phase comprise priority data pages that have been accessed a threshold number of times over a certain time period. Information about which pages are frequently accessed may be determined during runtime and recorded in the transaction log. After a crash, a data recovery process may use the information in the log to determine what pages are frequently accessed. Thus, frequently used pages that are accessed multiple times in a given time period may be flagged for processing during the transitional redo phase. Such frequently accessed pages may include system transaction pages, pages listed in the dirty page table, transaction logs, allocation maps, higher level B-Tree indexes and any other pages that are frequently accessed by the workload. Thus, criteria for flagging a page for transitional phase processing may include frequently accessed pages, pages required for s system transaction undo and other pages for which transitional phase processing may be desirable.

Method 200 includes, upon completion of the system transaction undo phase, an act of making available those pages that were processed during the transitional redo phase as well as those database pages that are not scheduled for processing during the final redo phase (act 240). For example, database availability module 130 may make at least those pages that were processed during the transitional redo phase available to user 105. Module 130 may also make those database pages that are not scheduled for processing during the final redo phase available to the user. Thus, module 130 can make database 110 available to users upon completion of the system transaction undo phase 420. Once the database is made available, the user can access any database page that is not scheduled for processing during final redo phase 435.

Pages that are scheduled for processing during final redo phase may be tracked on a per-page basis. As such, the requested pages that are being processed in the final redo phase are only blocked until the requested page is redone, and are released before the final redo phase is complete. These pages scheduled for final redo phase processing are flagged with a different flag that specifically identifies the pages for final redo phase processing.

In some cases, each page may be latched before being accessed, so that during the final redo phase, if a page is waiting to be re-processed and if final redo is not complete, user requests are blocked until the final redo phase is complete. In this manner, the user will be prevented from accessing data that is not up-to-date. If the system determines that a page is not found in the dirty page table, the system applies a latch and allows access to the page. In some cases, locks may be reacquired for user transaction undo to ensure that users are prevented from accessing uncommitted data. User transaction undo phase 435 may then be performed after the final redo phase is complete. At this point the entire database is up-to-date and is fully recovered.

FIG. 3 illustrates a flowchart of a method 300 for determining which data pages including unprocessed transactions are to be processed during a transitional redo phase. The method 300 will now be described with frequent reference to the components and data of environment 100.

Method 300 includes an act of initiating an analysis phase of a database recovery, wherein the analysis phase scans a database transaction log and builds a dirty page table that includes one or more pages corresponding to unprocessed data transactions (act 310). For example, database recovery phase initiating module 115 may initiate analysis phase 410. The analysis phase, as explained above, may scan database transaction log 135 and build dirty page table 140 which includes pages 141 which corresponding to unprocessed data transactions. The analysis may further determine which pages are being modified, which transaction the pages were part of, and which pages are necessary for the system transaction undo phase.

Method 300 includes an act of accessing the database transaction log to determine which priority data pages have been accessed a threshold number of times over a specified time period (act 320). For example, the database may access transaction log 135 to determine which pages 141 have been accessed a certain number of times. Information about which pages are frequently accessed may be determined during runtime and recorded in the transaction log. After a crash, a data recovery process may use the information in the log to determine what pages are frequently accessed. A threshold number indicating that a page is frequently accessed may be changeable and dynamically adjustable. Thus, in some instances, the threshold number may be lower, potentially resulting in a lower number of pages being priority data pages (as there is less time for a page to be accessed more than once). The opposite is also true: when the threshold number is higher (i.e. a longer time period), it may result in a higher number of pages being priority data pages (as there is more time for a page to be accessed more than once).

Method 300 includes an act of accessing the dirty page table to determine which data pages including unprocessed transactions are to be processed during the transitional redo phase (act 330). For example, database 110 may access dirty page table 140 to determine which data pages including unprocessed transactions are to be processed during the transitional redo phase 415. One or more pages in the dirty page table may be flagged for processing during phase 415. Moreover, linked lists may be created which list the flagged pages that are to be processed during the transitional redo phase. These lists may include pages that are required by system transaction undo, or have been accessed a threshold number of times within a specified time period.

Method 300 includes an act of processing both the priority data pages and the determined data pages including unprocessed transactions during the transitional redo phase, before the final redo phase is reached (act 340). For example, the database may process both those pages marked as priority data pages and the unprocessed transaction pages during the transitional redo phase. These pages are thus processed before the final redo phase is reached. Those pages that were processed during the transitional redo phase may be made available, as well as those database pages that are not scheduled for processing during the final redo phase upon completion of the system transaction undo phase.

Events may be instantiated which are configured to wait for those pages that are flagged for processing during final redo. If a user transaction tries to access a page that final redo phase hasn't finished processing (i.e. it's not up to date), the user transaction waits on an event and is not allowed to access the page. When final redo finishes processing the page, this event is signaled and the user is allowed to access the page. Each page may be latched before being accessed, so that during the final redo phase, if a page is waiting to be re-processed and if redo is not complete, user requests are blocked until the final redo phase completes processing the requested page.

Accordingly, methods, systems and computer program products are provided which implement a transitional redo phase to allow pre-redo phase data access. Moreover, methods, systems and computer program products are provided to determine which data pages including unprocessed transactions are to be processed during a transitional redo phase.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a computer system including at least one processor and a memory, and which is included in a computer networking environment including a plurality of other computing systems and at least one database server, a computer-implemented method for implementing a transitional redo phase during recovery following a failure of the database or database server, the transitional redo phase allowing at least limited access to the database prior to a final redo phase which provides full recovery, the computer-implemented method comprising the following acts:

following detection of a database failure at a database server, initiating an analysis phase of a database recovery by scanning a database transaction log to identify dirty pages that represent pages having unprocessed data transactions as a result of the database failure;

building a table of the identified dirty pages;

analyzing the table of identified dirty pages using one or more predetermined criteria to determine which dirty pages are to be prioritized for processing during the transitional redo phase and prior to a full recovery provided during a final redo phase, when all other dirty pages will be processed;

processing the prioritized dirty pages during the transitional redo phase and before the final redo phase is reached; and upon completion of a system transaction undo phase which corresponds to completion of all unprocessed data transactions of the prioritized dirty pages, making available to database users the previously prioritized dirty pages with the now completed data transactions for them that were processed during the transitional redo phase, making available to database users any other pages that were unaffected by the database failure, and then beginning the final redo phase to complete full database recovery for any remaining dirty pages that were not prioritized, such that all previously prioritized dirty pages with the now completed data transactions and the any other pages that were unaffected by the database failure are accessible by database users even-during the final redo phase, wherein any remaining dirty pages of the dirty page table that were not prioritized and are thus scheduled for processing during the final redo phase are latched before being accessed, such that during the final redo phase, if a page is waiting to be re-processed and if redo is not complete, user requests are blocked until the final redo phase completes processing the requested page.

2. The method of claim 1, wherein database recovery is tracked at a page level, such that any remaining dirty pages that were not prioritized that are being processed in the final redo phase are only blocked until each such page is redone, with at least some completed pages then being released for access by database users before the finale redo phase is complete.

3. The method of claim 1, further comprising adding a flag to entries of the dirty page table corresponding to prioritized dirty pages that are to be processed during the transition redo phase.

4. The method of claim 3, further comprising instantiating an event configured to wait for any remaining dirty pages of the dirty pages table that were not flagged and are thus scheduled for processing during the finale redo phase.

5. The method of claim 3, further comprising creating a Linked list of the prioritized dirty pages that are to be processed during the transitional redo phase using the added flags.

6. The method of claim 1, further comprising determining which pages are required to be completed to define the system transaction undo phase which corresponds to completion of all unprocessed data transaction of the prioritized dirty pages.

7. The method of claim 6, further comprising flagging those prioritized dirty pages that are to be processed for the system transaction undo phase, wherein the flags indicate that the prioritized dirty pages are to be processed in order to complete the transitional redo phase.

8. The method of claim 1, wherein the prioritized dirty pages that are to be processed during the transitional redo phase comprise priority data pages that have been accessed a threshold number of times.

9. The method of claim 8, wherein the priority data pages comprise at least one of the following: a system transaction page, a transaction log, an allocation map, higher level B-Tree indexes and any other pages frequently accessed by a workload.

10. The method of claim 1, further comprising reacquiring locks for user transaction undo to ensure that users are prevented from accessing uncommitted data.

11. The method of claim 1, wherein upon determining that a page is not found in the dirty page table, a latch is applied to that page and access to the page is allowed in response to user requests.

12. In a computer system including at least one processor and a memory, and which is included in a computer networking environment including a plurality of other computing systems and at least one database server, a computer program product comprising physical computer storage media having computer-executable instructions which, when executed by a processor, cause a computing system to implement a method for a transitional redo phase during recovery following a failure of the database or database server, the transitional redo phase allowing at least limited access to the database prior to a final redo phase which provides full recovery, and the computer-implemented method comprising the following acts:

following detection of a database failure at a database server, initiating an analysis phase of a database recovery by scanning a database transaction log to identify dirty pages that represent pages having unprocessed data transactions as a result of the database failure;

building a table of the identified dirty pages;

analyzing the table of identified dirty pages using one or more predetermined criteria to determine which dirty pages are to be prioritized for processing during the transitional redo phase and prior to a full recovery provided during a final redo phase, when all other dirty pages will be processed;

processing the prioritized dirty pages during the transitional redo phase and before the final redo phase is reached; and upon completion of a system transaction undo phase which corresponds to completion of all unprocessed data transactions of the prioritized dirty pages, making available to database users the previously prioritized dirty pages with the now completed data transactions for them that were processed during the transitional redo phase, making available to database users any other pages that were unaffected by the database failure, and then beginning the final redo phase to complete full database recovery for any remaining dirty pages that were not prioritized, such that all previously prioritized dirty pages with the now completed data transactions and the any other pages that were unaffected by the database failure are accessible by database users even during the final redo phase, wherein any remaining dirty pages of the dirty page table that were not prioritized and are thus scheduled for processing during the final redo phase are latched before being accessed, such that during the final redo phase, if a page is waiting to be re-processed and if redo is not complete, user requests are blocked until the final redo phase completes processing the requested page.

13. The computer program product of claim 12, wherein the computer-executable instructions for the method include flagging the prioritized dirty pages for processing during the transitional redo phase.

14. The computer program product of claim 13, wherein the computer-executable instructions for the method include instantiating an event configured to wait for the prioritized dirty pages that are flagged for processing during the transitional redo phase.

15. The computer program product of claim 13, wherein the computer-executable instructions for the method include creating a linked list of the flagged dirty pages that are to be processed during the transitional redo phase.

16. A computer system comprising the following:

one or more processors;

system memory;

at least one database server having a stored database;

one or more computer storage media having stored thereon computer-executable instructions that, when executed by the one or more processors, cause a computer-implemented method to be performed for a transitional redo phase during recovery following a failure of the database or database server, the transitional redo phase allowing at least limited access to the database prior to a final redo phase which provides full recovery, and the computer-implemented method comprising the following acts:

following detection of a database failure at a database server, initiating an analysis phase of a database recovery by scanning a database transaction log to identify dirty pages that represent pages having unprocessed data transactions as a result of the database failure;

building a table of the identified dirty pages;

analyzing the table of identified dirty pages using one or more predetermined criteria to determine which dirty pages are to be prioritized for processing during the transitional redo phase and prior to a full recovery provided during a final redo phase, when all other dirty pages will be processed;

processing the prioritized dirty pages during the transitional redo phase and before the final redo phase is reached;

upon completion of a system transaction undo phase which corresponds to completion of all unprocessed data transactions of the prioritized dirty pages, making available to database users the previously prioritized dirty pages with the now completed data transactions for them that were processed during the transitional redo phase, making available to database users any other pages that were unaffected by the database failure, and then beginning the final redo phase to complete full database recovery for any remaining dirty pages that were not prioritized, such that all previously prioritized dirty pages with the now completed data transactions and the any other pages that were unaffected by the database failure are accessible by database users during the final redo phase; and during the final redo phase, tracking each of the other dirty pages that were not prioritized on a per-page basis such that, as the uncompleted data transactions are completed for each of the other dirty pages that were not prioritized, making those pages available to database users incrementally as each additional page is completed, such that requested pages that are being processed in the final redo phase are only blocked until the requested page is redone, and are released before the final redo phase is completed.

17. The system of claim 16, wherein user requests are received and processed at the database before the final redo phase is complete.

* * * * *